(12) United States Patent
Wolkov et al.

(10) Patent No.: US 10,326,787 B2
(45) Date of Patent: Jun. 18, 2019

(54) SYSTEM AND METHOD FOR DETECTING ANOMALIES INCLUDING DETECTION AND REMOVAL OF OUTLIERS ASSOCIATED WITH NETWORK TRAFFIC TO CLOUD APPLICATIONS

(71) Applicant: Microsoft Technology Licensing, LLC, Redmond, WA (US)

(72) Inventors: Anton Wolkov, Tel Aviv (IL); Shai Kaplan, Tel Aviv (IL); Yonatan Most, Kfar Saba (IL); Ido Bar Av, Bar kochva (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 246 days.

(21) Appl. No.: 15/433,039

(22) Filed: Feb. 15, 2017

(65) Prior Publication Data
US 2018/0234443 A1  Aug. 16, 2018

(51) Int. Cl.
*H04L 29/06* (2006.01)
*G06F 17/50* (2006.01)
(Continued)

(52) U.S. Cl.
CPC ...... *H04L 63/1425* (2013.01); *G06F 17/5009* (2013.01); *G06F 21/55* (2013.01);
(Continued)

(58) Field of Classification Search
CPC ............. H04L 63/1425; H04L 63/1441; G06F 17/5009
See application file for complete search history.

(56) References Cited

U.S. PATENT DOCUMENTS 6,742,124 B1  5/2004  Kilpatrick et al.
7,860,870 B2 *  12/2010  Sadagopan ....... G06F 17/30867
  707/748

(Continued)

FOREIGN PATENT DOCUMENTS

WO  WO-2015012749 A1  9/2015

OTHER PUBLICATIONS

Santin, Olivia Guerra, Behavioural Patterns and User Profiles related to energy consumption for heating., Energy and Buildings Journal, vol. 43 (2011), p. 2662-2672. (Year: 2011).*

(Continued)

*Primary Examiner* — Carl G Colin
*Assistant Examiner* — Vance M Little
(74) *Attorney, Agent, or Firm* — Workman Nydegger

(57) ABSTRACT

An anomaly detection system is provided and includes a processor, a memory and a security application stored in the memory and including instructions. The instructions are for collecting behavior data corresponding to users of an organization accessing cloud applications. The behavior data includes parameters tracked over time for the users. The instructions are for: creating a first model based on the behavior data tracked for the users; creating a second model corresponding to a first user based on the parameters tracked for the users except the first user, where the second model excludes behavior data pertaining to the first user; scoring the second model based on the first model to generate a first score; determining whether the first user is an outlier based on the first score; and removing the behavior data corresponding to the first user from the first model if the first user is an outlier.

19 Claims, 4 Drawing Sheets

(51) Int. Cl.
  *G06F 21/55* (2013.01)
  *H04L 29/08* (2006.01)
  *G06K 9/62* (2006.01)

(52) U.S. Cl.
  CPC .......... *G06F 21/552* (2013.01); *G06F 21/554* (2013.01); *G06K 9/6277* (2013.01); *G06K 9/6284* (2013.01); *H04L 63/1441* (2013.01); *H04L 67/22* (2013.01)

(56) References Cited

U.S. PATENT DOCUMENTS

| | | | |
|---|---|---|---|
| 8,713,141 B1 | 4/2014 | Liu et al. | |
| 8,949,677 B1 | 2/2015 | Brundage et al. | |
| 9,270,765 B2 | 2/2016 | Narayanaswamy et al. | |
| 9,295,028 B2 * | 3/2016 | Jover | H04W 68/00 |
| 2004/0039548 A1 | 2/2004 | Selby et al. | |
| 2005/0111367 A1 * | 5/2005 | Jonathan Chao | H04L 63/1408 370/235 |
| 2005/0222806 A1 | 10/2005 | Golobrodsky | |
| 2006/0015492 A1 | 1/2006 | Keating et al. | |
| 2007/0150949 A1 | 6/2007 | Futamura et al. | |
| 2007/0245420 A1 | 10/2007 | Yong et al. | |
| 2011/0153270 A1 * | 6/2011 | Hoffman | G06F 17/18 702/179 |
| 2013/0297767 A1 | 11/2013 | Kozine et al. | |
| 2014/0096249 A1 | 4/2014 | Dupont et al. | |
| 2015/0172321 A1 | 6/2015 | Kirti et al. | |
| 2015/0269050 A1 | 9/2015 | Filimonov et al. | |
| 2015/0334129 A1 * | 11/2015 | Moyle | G06F 21/552 726/1 |
| 2016/0203316 A1 * | 7/2016 | Mace | G06F 21/55 726/23 |
| 2016/0217022 A1 | 7/2016 | Velipasaoglu et al. | |

OTHER PUBLICATIONS

Dirik, Ahmet Emir, et al., Modeling user choice in the PassPoints graphical password scheme., Symposium on Usable Privacy and Security (SOUPS) 2007, Jul. 18-20, 2007 Pittsburgh, USA. (Year: 2007).*

Cao, et al., "TargetVue: Visual Analysis of Anomalous User Behaviors in Online Communication Systems", In Proceedings of IEEE Transactions on Visualization and Computer Graphics, Oct. 25, 2015, 10 Pages.

* cited by examiner

SYSTEM AND METHOD FOR DETECTING ANOMALIES INCLUDING DETECTION AND REMOVAL OF OUTLIERS ASSOCIATED WITH NETWORK TRAFFIC TO CLOUD APPLICATIONS

FIELD

The present disclosure relates to security applications, and more particularly to detecting anomalies associated with access to cloud applications.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Cloud applications may be implemented via virtual machines (VMs) and or physical machines (PMs). The VMs and the PMs may be implemented in a cloud-based network. Cloud-based networks allow computer processing and storing needs to be moved from on premises networks to hybrid cloud or fully cloud-based networks while satisfying data security access requirements. The cloud applications can be accessed from client stations of organizations at remote locations.

SUMMARY

An anomaly detection system is provided and includes a processor, a memory and a security application. The security application is stored in the memory and includes instructions, which are executable by the processor and are configured to collect behavior data corresponding to users of an organization accessing cloud applications via a distributed network. The behavior data includes one or more parameters tracked over time for the users. The cloud applications are implemented on one or more server computers of a service provider. The instructions are further configured to: create a first model for the organization based on the behavior data tracked for the users; create a second model corresponding to a first user of the users based on the one or more parameters tracked for the users except the first user, where the second model excludes behavior data pertaining to the first user; score the second model based on the first model to generate a first score; determine whether the first user is an outlier based on the first score; remove the behavior data corresponding to the first user from the first model if the first user is determined to be an outlier; recreate the first model based on the behavior data tracked for the users except for the first user; detect an anomaly based on the recreated first model; and perform a countermeasure in response to detection of the anomaly.

In other features, an anomaly detection system is provided and includes a processor, a memory and a security application. The security application is stored in the memory and includes instructions, which are executable by the processor and are configured to collect behavior data corresponding to client computers of an organization accessing cloud applications via a distributed network. The behavior data includes one or more parameters tracked over time for the client computers. The cloud applications are implemented on one or more server computers of a service provider. The instructions are further configured to: create a first model for the organization based on the behavior data tracked for the client computers; create a second model corresponding to a first client computer of the client computers based on the one or more parameters tracked for the client computers except the first client computer, where the second model excludes behavior data pertaining to the first client computer; score the second model based on the first model to generate a first score; determine whether the first client computer is an outlier based on the first score; remove the behavior data corresponding to the first client computer from the first model if the first client computer is determined to be an outlier; recreate the first model based on the behavior data tracked for the client computers except for the first client computer; detect an anomaly based on the recreated first model; and perform a countermeasure in response to detection of the anomaly.

In other features, a non-transitory tangible computer readable medium storing instructions executable by a processor for detecting an anomaly associated with access of a cloud application is provided. The instructions are for collecting behavior data corresponding to users of an organization accessing cloud applications via a distributed network, where the behavior data includes one or more parameters tracked over time for the users, and where the cloud applications are implemented on one or more server computers of a service provider. The instructions are further for: creating a first model for the organization based on the behavior data tracked for the users; creating a second model corresponding to a first user of the users based on the one or more parameters tracked for the users except the first user, where the second model excludes behavior data pertaining to the first user; scoring the second model based on the first model to generate a first score; determining whether the first user is an outlier based on the first score; removing the behavior data corresponding to the first user from the first model if the first user is determined to be an outlier; recreating the first model based on the behavior data tracked for the users except for the first user; detecting the anomaly based on the recreated first model; and performing a countermeasure in response to detection of the anomaly.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

Figure 1:
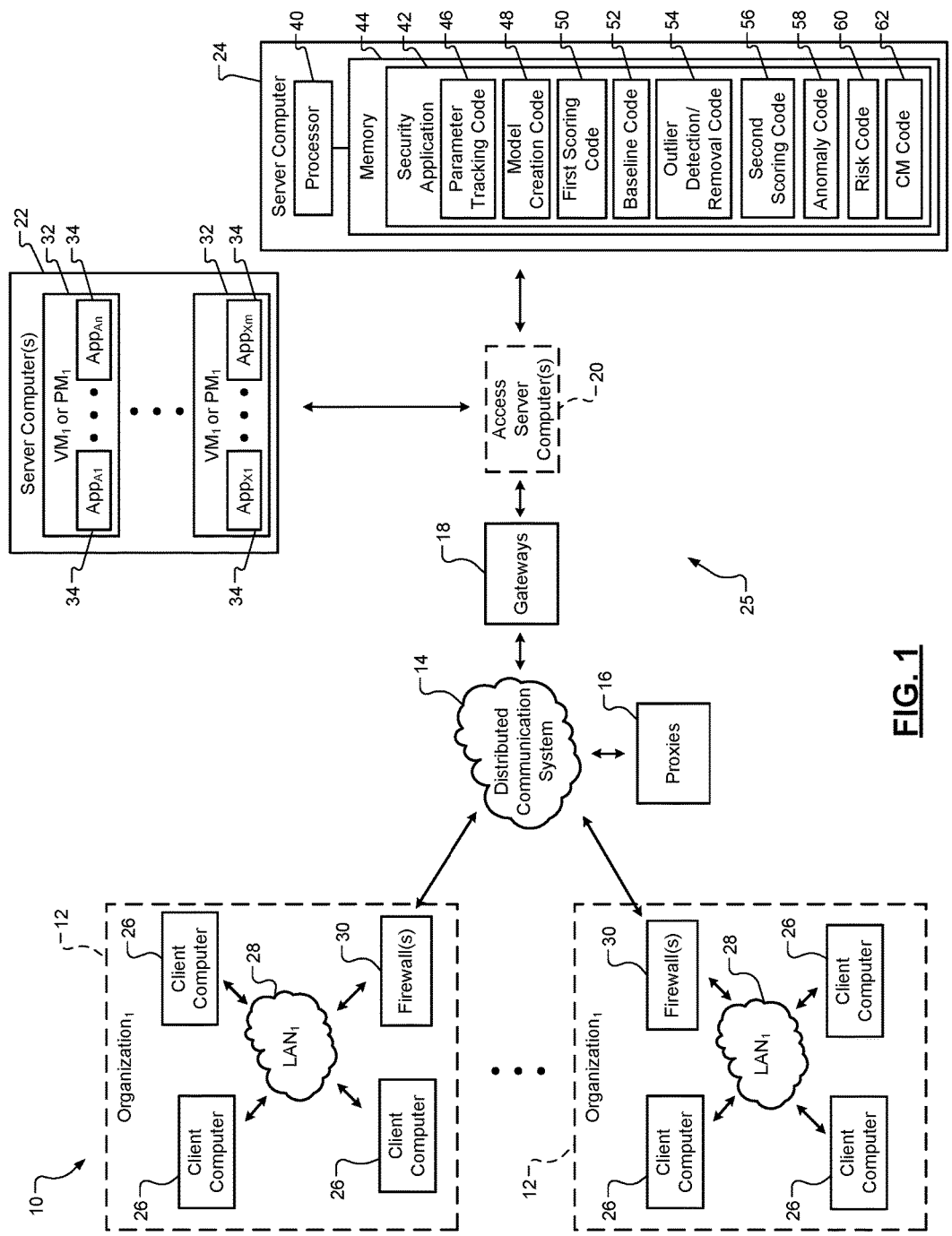
FIG. 1 is a functional block diagram of an example of a security system including a security application in accordance with an embodiment of the present disclosure.

A security application (e.g., Cloud Application Security®) by Microsoft®) can be provided as a service application by a service provider and used to monitor cloud applications implemented in a cloud-based network. The security application can monitor, for example, traffic between client computers of organizations and accessed cloud applications. The security applications disclosed herein: monitor information, such as data, logs, parameters, and/or risk factors associated with access of cloud applications; detect outlier users/client computers; remove collected information associated with the outlier users/client computers from one or more memories, tables, and/or models; and detect anomalies based on remaining information and/or models for non-outlier users/client computers. If for example, the anomalies are determined to be a high risk and/or associated with malicious activity, then a countermeasure may be performed to prevent further similar malicious activity.

Organization level anomaly detection is often affected by behavior of outliers. An outlier refers to a user and/or client computer that exhibits anomalous behavior and masks normal behavior and/or a model of other users and/or client computers in the organization. An outlier is not typically associated with malicious activity, but rather is associated with a specific operation that is different than most other users/client computers in the organization. Information associated with outliers skews models of the statistical information associated with the users/client computers. This is different than several large user/client computer groups, where each large group has a different behavior.

Some examples of outliers are: client computers running bots and/or watchdogs; service users; test users; and users/client computers running a rare script. A bot refers to a software application that runs automated tasks and/or scripts over the Internet. Trying to model a number of logins a user attempts is problematic as traffic patterns of bots can overshadow traffic patterns of other users/client computers. A watchdog refers to a software application used to watch certain activity. Watchdogs usually cycle through many machines (e.g., virtual machines (VMs) or physical machines (PMs)) and attempt to login to each of the machines. Outliers tend to perform periodical actions, which are rarely performed by other (referred to as "normal" or "typical") users. For example, a client computer running a rare script typically performs periodic actions, which are specific to the script. Information associated with non-outlier users/client computers may be tagged and used to detect anomalies without using information associated with outlier users/client computers.

The examples set forth below include systems and methods for detecting anomalies associated with access by non-outlier users/client computers to cloud applications. The examples include tracking activity to cloud applications and, based on the activity, detecting anomalies via a security application. The security application may be implemented in a cloud-based network and/or a network of a service provider and is used to monitor activity between (i) client computers and (ii) VMs and/or PMs of the cloud applications. The security application identifies cloud applications used by a network of an organization and provides risk scoring and risk assessment. The security application informs owners of client computers, VMs, PMs, organizations and/or service provider owners of detected anomalies, such that one or more countermeasures can then be performed.

FIG. 1 shows a security system 10 that includes client computers 12, a distributed communication system 14, proxies 16, gateways 18, one or more access server computers 20, and other server computers 22, 24. In some examples, the gateways 18, one or more access server computers 20, and one or more server computers 22 are implemented in a cloud-based network 25. In some examples, the server computer 24 is implemented in the cloud-based network 25 or in another service provider network. In another example, the access server computers 20 are not included in the security system 10 and the gateways 18 communicate directly with the server computers 22, 24. In the example shown, the client computers are owned by corresponding organizations 26. The organizations 26 may include local area networks (LANs) 28 and firewalls 30. The client computers 12 may access the distributed communication system 14 directly and/or via the LANs 28 and firewalls 30.

The cloud-based network 25 may be implemented by a cloud service provider and, in an embodiment, includes client virtual machines, network appliances and application server computers. Examples of network appliances include routers, switches, firewalls, proxy server computers, World Wide Web (or Web) server computers, wide area network (WAN) accelerators, intrusion detection system (IDS) devices, and intrusion prevention system (IPS) devices. The network appliances provide intermediary services between the application server computers and client computers. The client computers 12 can be implemented in the cloud-based network as VMs and/or PMs or can be located on premises. The network appliances and application server computers may be implemented as one or more VMs implemented in the cloud-based network.

The cloud-based network 25 may include one or more of the server computers 22, 24. The cloud-based network 25 further includes resources and/or containers that may be shared by the client computers 12. The cloud service provider provisions the resources (such as software applications having corresponding executable code, server computer processing time, and/or storage) via the cloud-based network 25. Cloud service providers implement infrastructure as a service (IaaS) and platform as a service (PaaS) using virtual machines (VMs) or containers. A container includes processing, storage and application resources. Data centers may include server computers that host the VMs or containers. Each server can host many VMs and/or containers. The VMs run on a guest operating system and interface with a hypervisor, which shares and manages server hardware and isolates the VMs. Unlike VMs, containers do not need a full OS to be installed or a virtual copy of the host server's hardware. Containers may include a few software modules and libraries and require the use of some portions of an operating system. As a result of the reduced footprint, many more containers can be deployed on a server as compared to virtual machines. The server computers 22, 24 may include VMs (e.g., $VMs_{1-Y}$ are shown), which may be implemented as PMs (e.g., $PMs_{1-Y}$). The software applications may be implemented on the server computers 22, 24, which may be referred to as physical machines.

The client computers 12 may be privately owned by different individuals and/or entities. In the example shown, the client computers 12 are owned by organizations 26. Each of the client computers 12 may access one or more cloud applications 34 stored in the server computers 22 and/or VMs 32. The organizations 26 may own and/or have paid access to corresponding ones of the VMs 32 and/or cloud applications 34. The client computers 12 may include desk/laptop computers, tablets, mobile phones, wearable devices, access terminals, and/or other network devices for accessing the cloud applications 34. Accessing of the cloud applications 34 may include: communicating with the cloud applications 34; transferring data, packets, information, etc. between the client computers 12 and the server computers 22 in association with the cloud applications 34; modifying and/or updating the cloud applications; and/or uploading and/or downloading the cloud applications 34 and/or files associated with the cloud applications 34.

The distributed communication system 14 may include routers, switches and/or other network devices for directing data and/or packets between (i) the client computers 12 and/or organizations 26 and (ii) the gateways 18. The distributed communication system 14 may include a network, such as a local area network (LAN), a wireless local area network (WLAN), and/or a wide area network (WAN) (e.g., the Internet). The proxies 16 may transfer data, packets, information, etc. between the firewalls 30 and the gateways 18. In an embodiment, the proxies 16 are implemented as part of the distributed communication system 14. The gateways 18 may transfer data, packets, information, etc. between the distributed communication system 14 and the access server computers 20. The access server computers 20 may provide access to direct communication with the server computers 22 and/or 24. In one embodiment, the access server computers 20 are implemented as client access server computers and facilitate providing services, such as services associated with software as a service (SaaS) applications, from the server computer 24 to the client computers 12. The gateways 18, the access server computers 20, the server computers 22 and/or the server computers 24 may be implemented in an internal network of a service provider that provides software applications.

The server computer 24 includes a processor 40 that executes software applications, such as a security application 42, which is stored in a memory 44. One or more of the VMs 32 may be implemented in the server computer 24. The security application 42 includes parameter tracking code 46, model creation code 48, first scoring code 50, baseline code 52, outlier detection and removal code 54, second scoring code 56, anomaly detection code 58, risk code 60 and countermeasure (CM) code 62. During operation, the security application 42 monitors behavior of the client computers 12 and/or users of the client computers 12 directed to access of the cloud applications 34. The client computers 12 may access the security application 42 via a web browser and corresponding website. The cloud application 34 collects data, parameters, risk factors, and/or information associated with the behavior and detects anomalies. The security application 42 evaluates the anomalies and performs countermeasures (e.g., generates alerts) to prevent malicious activity based on results of the evaluation. The security application 42 displays at client computers one or more windows/pages via the web browser of statistical data associated with the information collected, models generated, the outliers, the anomalies detected and/or corresponding alerts. The security application 42 and the code 46, 48, 50, 52, 54, 56, 58, 60 and 62 are further described below with respect to the method of FIG. 4.

Figure 2:
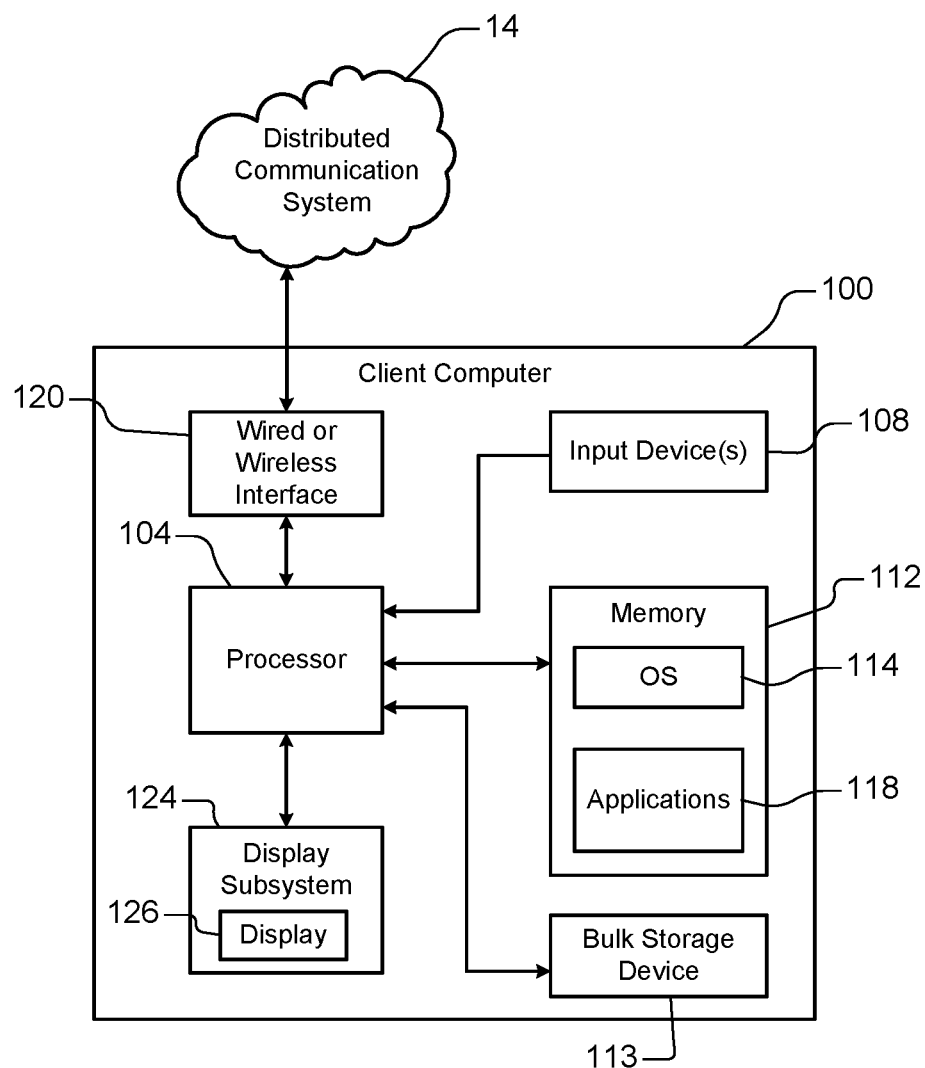
FIG. 2 a functional block diagram of an example of a client computer in accordance with an embodiment of the present disclosure.

In FIG. 2, a simplified example of a client computer 100 is shown. The client computers 12 of FIG. 1 may be implemented as the client computer 100. The client computer 100 includes a central processing unit (CPU) or processor 104 and an input device 108 such as a keypad, touchpad, mouse, etc. The client computer 100 further includes memory 112 such as volatile or nonvolatile memory, cache or other type of memory. The client computer 100 further includes bulk storage device 113 such as flash memory, a hard disk drive (HDD) or other bulk storage device.

The processor 104 of the client computer 100 executes an operating system 114 and one or more applications 118. For example, the applications 118 may include a browser. The client computer 100 further includes a wired interface (such as an Ethernet interface) and/or wireless interface (such as a Wi-Fi, Bluetooth, near field communication (NFC) or other wireless interface (collectively identified at 120)) that establishes a communication channel over the distributed communication system 14. The client computer 100 further includes a display subsystem 124 including a display 126.

Figure 3:
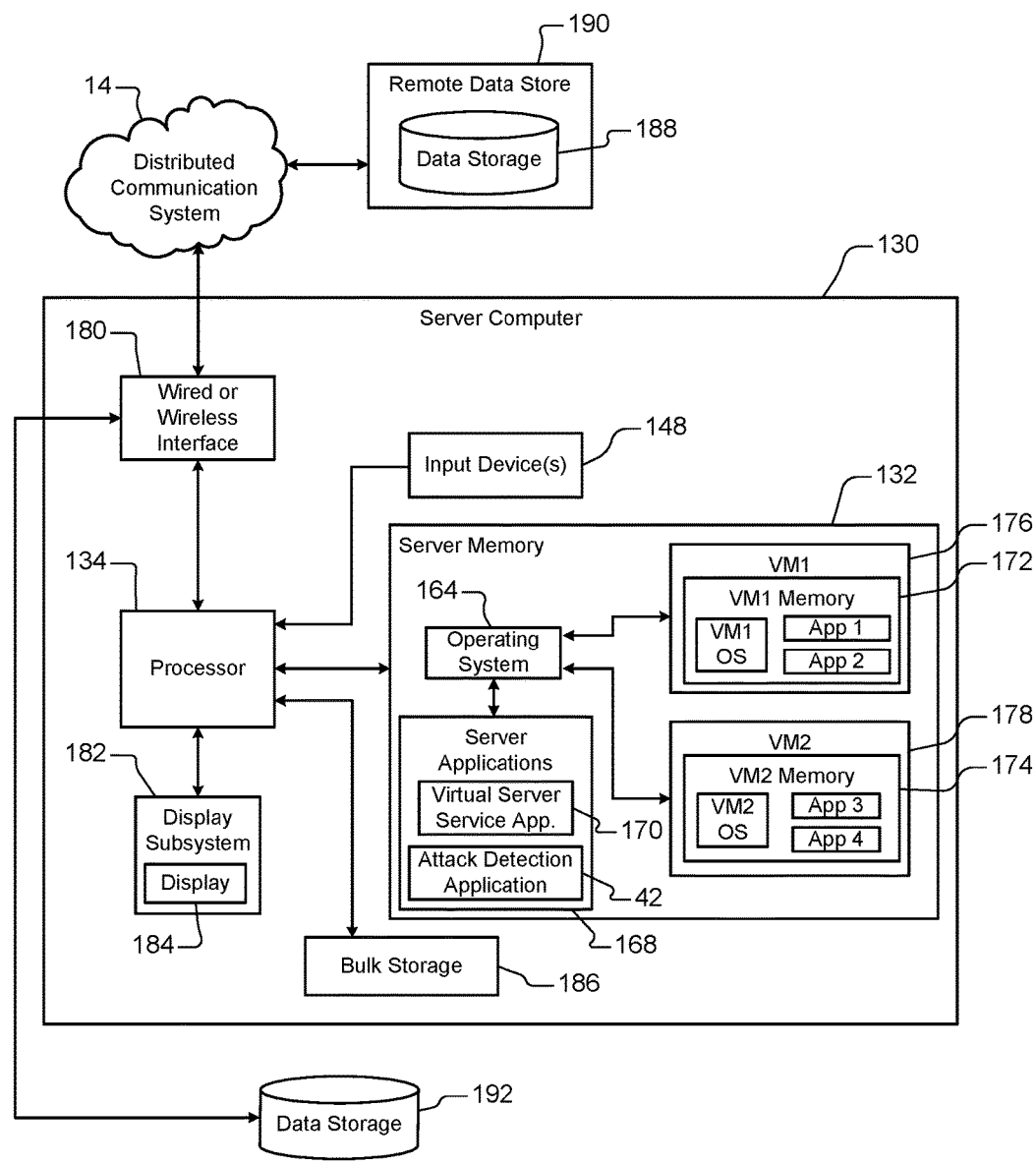
FIG. 3 is a functional block diagram of an example of a server computer incorporating applications in accordance with an embodiment of the present disclosure.

In FIG. 3, an example of a server computer 130 is shown. The server computers 20, 22, 24 of FIG. 1 may be implemented as and/or have similar architecture as the server computer 130. The server computer 130 includes one or more processors and an input device 148 such as a keypad, touchpad, mouse, etc. The server computer 130 further includes a server memory 132, such as volatile or nonvolatile memory, cache or other type of memory, and a processor 134. The processor 134 executes an operating system (OS) 164 and one or more server applications 168 and/or VM applications. Examples of server applications include the security application 42 and a virtual server service application 170, which is implemented in a virtualization layer and is executed along with the OS 164. The virtual server service application 170 creates a virtual environment in which VM (or guest) OSs (e.g., VM1 OS and VM2 OS) run. Example VM applications App 1, App 2, App 3, and App 4 are shown as being implemented in VM memories 172, 174 of VMs 176, 178, respectively. The VM applications may include instances of auto-generated websites, network appliances, storage applications, productivity applications, and/or other VM applications. VM applications App1-4 are shown as examples. Each of the VM memories may include one or more VM applications.

The server computer 130 further includes a wired or wireless interface 180 that establishes a communication channel over the distributed communication system 14. The server computer 130 further includes a display subsystem 182 that includes a display 184. The server computer 130 may further include a bulk storage device 186 such as flash memory, a hard disk drive (HDD) or other local or remote storage device. The processor 134 may also access a data storage 188 of a remote data store 190 via the interface 180 and the distributed communication system 14, or a data storage 192, such as a database, via the interface 180.

Figure 4:
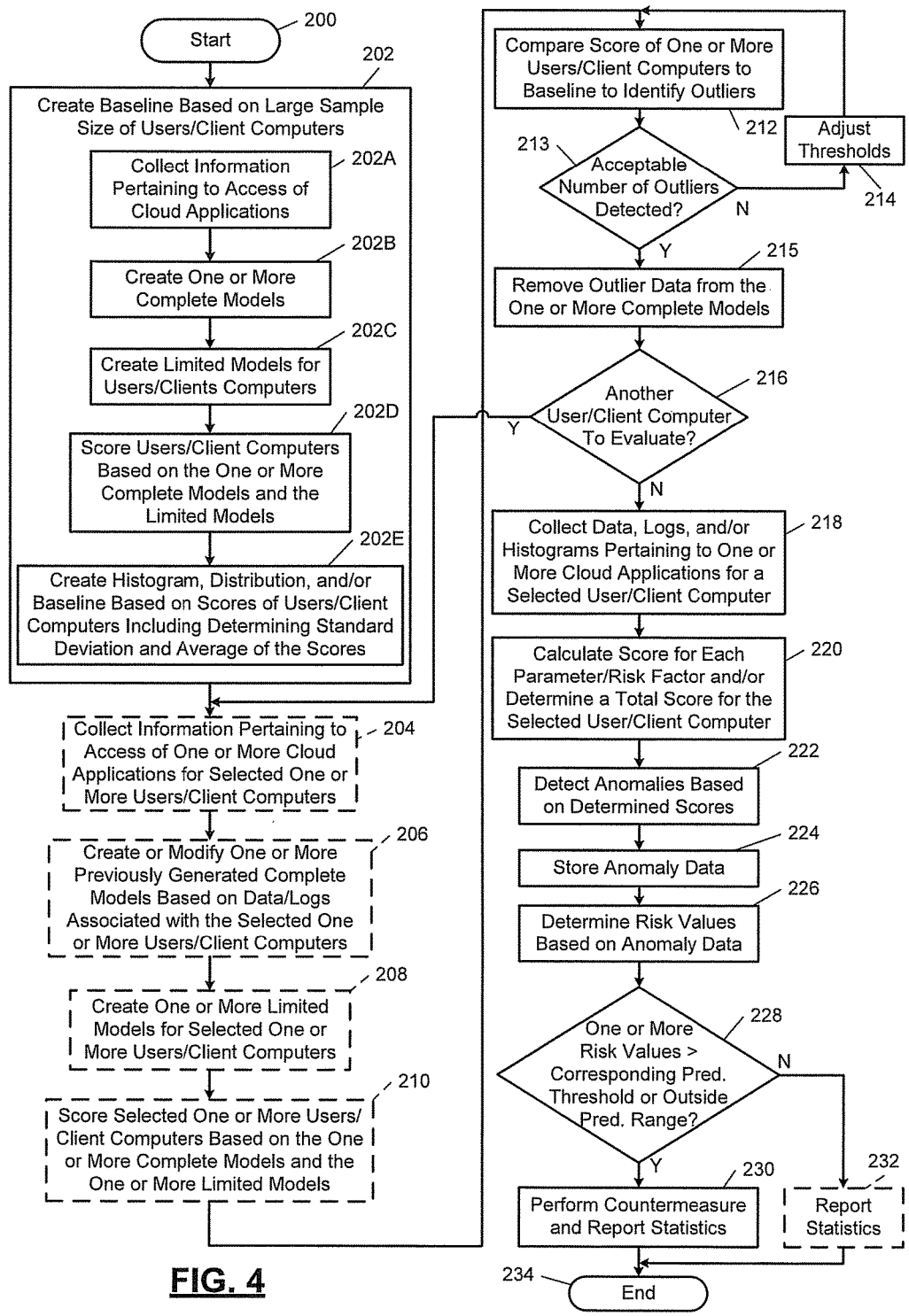
FIG. 4 illustrates security method in accordance with an embodiment of the present disclosure.

Operations of the client computers 12, proxies 16, gateways 18, server computers 20, 22, 24 and firewalls 30 of FIG. 1 are further described below with respect to the methods of FIG. 4. An example of a security method is illustrated in FIG. 4. Although the following operations are primarily described with respect to the implementations of FIG. 1, the operations may be modified to apply to other implementations of the present disclosure. The operations may be iteratively performed.

The method begins at 200 and includes execution of the security application 42 by the processor 40. At 202, the security application 42 creates a baseline based on a large sample size of users and/or client computers. The baseline provides a historical reference based on which outliers can be detected, as described in the following operations. At 202A, the security application 42 via the parameter tracking code 46 collects data, logs, packets, risk factors, and/or other related information associated with access of cloud applications 34. The related information is tracked over time and may be stored in the proxies 16, gateways 18, and/or firewalls 30. As an example, a log of access information may include an access start time, an access end time, a duration of access, an Internet protocol (IP) address, a username, a cloud application name, an upload volume of data, a download volume of data, a number of transactions, a number of accesses, a number of accesses in a predetermined period, a geographical location where the access occurred, etc. In one embodiment, the security application 42 requests and receives the related information from the proxies 16, the gateways, 18, the access server computers 20, and/or the firewalls 30. In another embodiment, the related information is collected and monitored for a predetermined training period.

The security application 42 may determine one or more parameters and/or risk factors to monitor. These parameters and/or risk factors may be requested from the firewalls, proxies, and/or gateways. The selected parameters and/or risk factors may include parameters and/or risk factors provided in the log of access information and/or parameters calculated based on the parameters and/or risk factors provided in the log of access information. Some examples of parameters and/or risk factors are: a user identifier; a client computer identifier; an address of the client computer; a cloud application identifier; a number of transactions between a user/client computer and one or more cloud applications; an amount of traffic between a user/client computer and one or more cloud applications; a number of transactions between a user/client computer and one or more cloud applications with a predetermined period of time; an amount of traffic between a user/client computer and one or more cloud applications within a predetermined period of time; periods of use of one or more cloud applications by a user/client computer; a total number of cloud applications accessed by a user/client computer; and a total number of cloud applications accessed by a user/client computer within a predetermined period of time.

Some of the parameters are risk factors, such as the: number of transactions between a user/client computer and one or more cloud applications; amount of traffic between a user/client computer and one or more cloud applications; number of transactions between a user/client computer and one or more cloud applications with a predetermined period of time; amount of traffic between a user/client computer and one or more cloud applications within a predetermined period of time; periods of use of one or more cloud applications by a user/client computer; total number of cloud applications accessed by a user/client computer; and total number of cloud applications accessed by a user/client computer within a predetermined period of time. Other parameters and risk factors include: country of origin of a user and/or client computer; compliance of activity performed by a user and/or client computer; and a reputation of a user and/or client computer.

The one or more parameters and/or risk factors may be for one or more users/client computers, users/client computers of an organization, a predetermined group of users/client computers, and/or one or more cloud applications. The predetermined timer periods may be for one or more days. The monitored parameters may be monitored per user, per client computer, per cloud applications and/or a combination thereof. The parameters and/or risk factors may be stored in tables in the memory 44 and accessed during the following operations.

At 202B, the security application 42 via the model creation code 48 creates one or more complete models, where each of the complete models is associated with one or more parameters and represents a behavior of the users and/or client computers for a particular group, organization, cloud application, type of cloud application, etc. In one embodiment, each of the complete models is a histogram. Each of the histograms may be associate with a particular behavior and include rectangles representing quantitative values for the one or more parameters associate with that particular behavior, such as: a frequency of use of a cloud application, a number of accesses to of a cloud application, a number of login failures of a user, a number of transactions with a cloud application, and/or other parameter and/or risk factors. In an embodiment, the complete models are generated with information pertaining to one or more outliers being included. In another embodiment, the complete models are generated without the information pertaining to one or more outliers being included. By not including the information pertaining to the outliers, the baseline is created based on the information associated with the "normal" users/client computers.

At 202C, the security application 42 via the model creation code 48 creates limited models, where each of the limited models is associated with one or more parameters and represents a behavior of the users and/or client computers for a particular group, organization, cloud application, type of cloud application, etc. Each of the limited models is not associated with one or more selected users and/or client computers. In an embodiment, a single user and/or client computer is selected and corresponding parameter information for that selected user/client computer is removed from one or more of the complete models to create the corresponding one or more limited models. This filters out the activity associated with the single user/client computer. In another embodiment, a small set of users and/or client computers are selected to create the corresponding one or more limited models. In an embodiment, the small set of users/client computers includes less than or equal to 10 users/client computers. The information corresponding to the activity of the small set of users/client computers is filtered out of one or more complete models to provide the one or more limited models. In another embodiment, a limited model may be generated for each user, client computer, and/or small set of users/client computers.

In yet another embodiment, each of the limited models is a histogram. Each of the histograms may be associate with a particular behavior and include rectangles representing quantitative values for the one or more parameters associate with that particular behavior, such as: a frequency of use of a cloud application, a number of accesses to of a cloud application, a number of login failures of a user, a number of transactions with a cloud application, and/or other parameters and/or risk factors. In another embodiment, the complete models and the limited models are not histograms, but rather are exponential distribution models or distribution models of another type (i.e. not histograms).

At 202D, the security application 42 via the first scoring code 50 scores the users and/or client computers based on the one or more complete models and the limited models. In one embodiment and for each score determined, cumulative distribution functions (CDFs) are created respectively for one of the limited models and a corresponding one of the complete models. The two CDFs are compared and a difference between the CDFs is determined as the score. In another embodiment, a two-sample Kolmogorov-Smirnov test is used to determine each score based on one of the limited models and the corresponding complete model. In yet another embodiment, the CDFs are generated and/or the two-sample Kolmogorov-Smirnov test is performed when the complete models and the limited models are histograms. In another embodiment, a distance between a mean of a complete model and a mean of a limited model is determined when the complete models and the limited models are exponential distribution models or distribution models of another type (i.e. not histograms). The determined distance is the score.

At 202E, the security application 42 via the baseline code 52 may generate a histogram, a distribution, and/or a tabulated baseline based on the scores determined during operation 202D for the users/client computers. Each of the baselines may be for users, client computers, users/client computers of an organization, a predetermined group of users/client computers, one or more cloud applications, and/or one or more types of cloud applications. Examples of types of cloud applications are data storage applications, productivity applications, etc. In one embodiment, the scores are included in a distribution for a type of baseline and a corresponding association set identifier. The association set identifier may identify the users, client computers, cloud applications, the one or more types of cloud applications, the organization and/or the predetermined group. In an embodiment, determination of the baseline includes determining a standard deviation and an average of scores for one or more parameters, one or more cloud applications, a type of cloud application, an organization, and/or a group of users/client computers.

The security application 42 via the baseline code 52 may determines total scores for each user and/or client computer and/or for each set of one or more users/client computers. In an embodiment, each of the total scores is generated based on the individual scores. A total score may be equal to a sum, product and/or average of the individual scores for (i) a user and/or client computer, or (ii) a set of one or more users/client computers. A total score may be equal to a weighted average of individual scores, where each individual score is multiplied by a corresponding weight value and then summed to provide the total score.

The following operations 204, 206, 208, 210 may not be performed if already performed during operation 202. At 204, the security application 42 via the parameter tracking code 46 collects data, logs, packets, risk factors, and/or other related information associated with access of one or more cloud applications 34 by a selected one or more users and/or client computers.

At 206, the security application 42 via the model creation code 48 creates or modifies one or more complete models based on the information collected during operation 204. The one or more complete models generated during operation 202B may be updated based on the information collected during operation 204. The one or more complete models may be created in a similar manner as described with respect to operation 202B for the selected one or more users/client computers.

At 208, the security application 42 via the model creation code 48 creates one or more limited models based on the information collected during operation 204. The one or more limited models may be created in a similar manner as described with respect to operation 202C including removal of information associated with the selected one or more user/client computers from the corresponding complete model to provide the limited model.

At 210, the security application 42 via the first scoring code 50 scores the selected one or more users/client computers based on the one or more complete models and the limited models generated during operations 206, 208. In one embodiment and for each score determined, a CDF is determined for one of the limited models and a corresponding one of the complete models. The two CDFs are compared and a difference between the CDFs is determined as the score. In another embodiment, a two-sample Kolmogorov-Smirnov test is used to determine each score based on one of the limited models and the corresponding complete model. In yet another embodiment, the CDFs are generated and/or the two-sample Kolmogorov-Smirnov test is performed when the complete models and the limited models are histograms. In another embodiment, a distance between a mean of a complete model and a mean of a limited model is determined when the complete models and the limited models are an exponential distribution model or other type of distribution model. The distance is the score.

At 212, the security application 42 via the outlier detection and removal code 54 compares (i) the scores determined during operation 202D and/or 210 for the selected one or more users/client computers to (ii) baseline scores determined during 202D and/or the baseline, baseline scores, standard deviation and/or average of scores determined during operation 202E. In one embodiment, when the difference of the scores of the selected one or more users/client computers and the baseline scores (referred to as absolute distances) are greater than a predetermined threshold, the selected one or more users/client computers are identified as outliers. In another embodiment, when the scores for the selected one or more users/client computers is greater than the average of the scores by more than a second predetermined threshold, then the one or more users/client computers are identified as outliers. The security application 42 searches for large gaps between scores/values for a small group of users/client computers (or outliers) and scores/values for "normal" users/client computers. The information associated with the outliers may be tagged as outlier information.

At 213, the security application 42 via the outlier detection and removal code 54 determines if an acceptable number of outliers have been detected. If the number of outliers detected is greater than a predetermined amount, then operation 214 is performed, otherwise operation 215 is performed. At 214, the security application 42 via the outlier detection and removal code 54 may adjust the thresholds used to detect outliers. As an example, the thresholds may be increased to reduce the number of outliers detected. Operations 213, 214 prevent over-fitting and thus detection of too many outliers.

At 215, the security application 42 via the outlier detection and removal code 54 removes information pertaining to the outliers from the complete models. In an embodiment, the complete models are recreated based on non-outlier information and excluding the information pertaining to the detected one or more outliers. This updates the complete models for better detection of anomalies during the following operations.

At 216, the security application 42 determines whether another user/client computer is to be evaluated. If another user/client computer is to be evaluated, operation 204 may be performed, otherwise operation 218 is performed. At 218, the security application 42 via the parameter tracking code 46 collects data, logs, histograms that pertain to one or more cloud applications for a selected user/client computer. The selected user/client computer may be one of the users/client computers selected during operation 204 or may be a different user/client computer.

At 220, the security application 42 via the second scoring code 56 (i) calculates individual scores for each parameter and/or risk factor for the selected user/client computer, and/or (ii) determines a total score for the selected user/client computer. In an embodiment, the total score is generated based on the individual scores. The total score may be equal to a sum, product and/or average of the individual scores. The total score may be equal to a weighted average of the individual scores, where each individual score is multiplied by a corresponding weight value and then summed to provide the total score.

At 222, the security application 42 via the anomaly detection code 58 detects one or more anomalies based on the individual scores and/or the total score for each set of one or more users and/or client computers evaluated. Different types of anomalies may be detected. Example anomalies are: a sudden increase in an amount of upload data, a number of login failures, an amount of download data, and/or a number of transactions of a particular user on a particular cloud application; a sudden increase in an amount of upload data, an amount of download data, and/or a number of transactions of users on a particular cloud application; a particular user uploading and/or downloading a predetermined amount more data than other users for a particular cloud application; a user conducting a predetermined amount more transactions than other users for a particular cloud application; a sudden increase in a number of users using a particular cloud application; and/or other anomalies.

In one embodiment, the security application 42 determines likelihood that the scores are to occur based on the baseline scores, which may include total scores. For example, if a difference between compared scores is greater than a predetermined amount, then an anomaly is identified. If a difference between compared scores is less than or equal to the predetermined amount, then an anomaly is not identified. The anomaly data may include a user identifier, a client computer identifier, a cloud application identifier, an organization identifier, and/or one or more of the corresponding parameters. At 224, the security application 42 via the anomaly detection code 58 stores the information corresponding to the identified anomalies as anomaly data in memory.

At 226, the security application 42 via the risk code 60 determines risk values for the anomalies based on the anomaly data. This may include determining probabilities that the anomalies are to occur based on the baselines, scores of the anomaly data, the total scores, and/or differences between scores of the anomaly data and the baseline scores. The security application 42 determines a likelihood that an anomaly (or corresponding parameter and/or risk factor value) is to occur. The larger the likelihood, the larger the risk value.

At 228, the security application 42 via the countermeasure code 62 determines whether the one or more risk values are greater than corresponding predetermined thresholds and/or outside corresponding predetermined ranges. If the one or more risk values are greater than corresponding predetermined thresholds and/or outside corresponding predetermined ranges, operation 230 is performed, otherwise operation 232 may be performed.

At 230, the security application 42 via the countermeasure code 62 performs one or more countermeasures. As a first countermeasure, statistics are reported, which may include reporting the selected parameters and/or risk factors, identified anomalies, determined aggregated anomalies, risk values, user identifier, client computer identifier and/or address, cloud application identifier, type of cloud application, organization identifier, identifier of predetermined group, and/or other related statistic information. This information may be reported to corresponding users, client computers, owners and/or representatives of an organization, owners of VMs and/or PMs of cloud applications, and/or representatives of a service provider of the security application 42 and/or the cloud applications. As another countermeasure, the security application 42 may alert a user, prevent the user from accessing one or more cloud applications from any of the client computers 12, and/or limit access of the user to the one or more cloud applications. As another countermeasure, the security application 42 may alert a client computer, prevent the client computer from accessing one or more cloud applications, and/or limit access of the client computer to the one or more cloud applications. As yet another example, the user and/or the client computer may be limited to operating the one or more cloud applications is a safe operating mode with limited functions. As another countermeasure, the security application 42 may provide owners of VMs and/or PMs with an alert and the statistic information. As another countermeasure, the security application 42 may provide a representative and/or owner of an organization and/or a service provider with an alert and the statistic information. In one embodiment, security alerts are generated for the riskiest anomaly groups.

At 232, the security application 42 via the countermeasure code 56 reports the statistic information to corresponding users, client computers, owners of VMs and/or PMs of cloud applications, owners and/or representatives of an organization, and/or representatives of a service provider of the security application 42 and/or the cloud applications. The method may end at 234.

The above-described operations of FIG. 4 are meant to be illustrative examples; the operations may be performed sequentially, synchronously, simultaneously, continuously, during overlapping time periods or in a different order depending upon the application. Also, any of the operations may not be performed or skipped depending on the implementation and/or sequence of events.

Referring to FIG. 1, in one embodiment, the security application 42 monitors activity of the $VM_{1-N}$ and PMs by monitoring information, such as data, logs, parameters, and risk factors, associated with the packets transmitted to/from the $VM_{1-N}$ and the PMs. Based on the information received from the proxies 16, gateways 18, and firewalls 30, the security application 42 determines whether one or more of the users and/or client computers are attacking one or more of the cloud applications and/or corresponding VMs, PMs, and server computers. The security application 42 informs the owners of the VMs and PMs of malicious activity. This allows the owners, the VMs, and/or the PMs to take appropriate actions to prevent further attacks on and/or to block access to the cloud applications. Although the security application 42 is shown as being implemented in the server computer 24, the security application 42 may be implemented in the same server computer as one or more of the $VM_{1-N}$.

The above-provided examples allow for information associated with outliers to be detected and removed from complete models. This allows for more accurate anomaly detection to be conducted based on information associated with activity of non-outliers. The removal of outlier information prevents false detection of anomalies and/or false detection of malicious activity due to outliers.

The above-described examples also allow for risky behavior to be identified and reported. The examples are able to identify anomalies associated with cloud application access, for example, when a user is uploading an unusual amount of data to a cloud application or when multiple users are accessing a newly introduced cloud application.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

A processor may refer to a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The processor may include one or more interface circuits. In some examples, the interface circuits may include wired or wireless interfaces that are connected to a local area network (LAN), the Internet, a wide area network (WAN), or combinations thereof. The functionality of any given processor of the present disclosure may be distributed among multiple circuits that are connected via interface circuits. For example, multiple circuits may allow load balancing.

The term code, as used above, may include software, firmware, and/or microcode, and may refer to programs, routines, functions, classes, data structures, and/or objects. The term shared processor circuit encompasses a single processor circuit that executes some or all code from multiple circuits. The term group processor circuit encompasses a processor circuit that, in combination with additional processor circuits, executes some or all code from one or more circuits. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple circuits. The term group memory circuit encompasses a memory circuit that, in combination with additional memories, stores some or all code from one or more circuits.

The term memory or memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encode instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as JavaScript Object Notation (JSON), hypertext markup language (HTML) or extensible markup language (XML), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. An anomaly detection system comprising:
a processor;
a memory; and
a security application stored in the memory and including instructions, which are executable by the processor and are configured to:
collect behavior data corresponding to a plurality of users of an organization accessing cloud applications via a distributed network, wherein the behavior data includes one or more parameter(s) tracked over time for the plurality of users, and wherein the cloud applications are implemented on one or more server computer(s) of a service provider;
create a first model for the organization based on the behavior data tracked for the plurality of users;
create a second model corresponding to a first user of the plurality of users based on the one or more parameter(s) tracked for the plurality of users except the first user, wherein the second model excludes behavior data pertaining to the first user;
score the second model based on the first model to generate a first score, wherein generating the first score is performed by at least performing the following:
determining a first cumulative distribution function based on the first model;
determining a second cumulative distribution function based on the second model; and
calculating the first score as a distance between the first cumulative distribution function and the second cumulative distribution function;
determine whether the first user is an outlier based on the first score;
remove the behavior data corresponding to the first user from the first model if the first user is determined to be an outlier;
recreate the first model based on the behavior data tracked for the plurality of users except for the first user;
detect an anomaly based on the recreated first model; and
perform a countermeasure in response to detection of the anomaly.

2. The anomaly detection system of claim 1, wherein the security application is configured to:
collect scores for at least some of the plurality of users; and
determine whether the first user is an outlier by comparing the first score to the scores for the at least some of the plurality of users.

3. The anomaly detection system of claim 1, wherein the first model and the second model are histograms.

4. The anomaly detection system of claim 1, wherein the security application is configured to:
determine a baseline based on the behavior data of the plurality of users;
determine a plurality of models, where each of the plurality of models is for a respective one of the plurality of users;
score each of the plurality of models based on the baseline or the first model, wherein the plurality of models do not include the second model;
determine a standard deviation and a mean based on the scores of the plurality of models; and
determine whether the first user is an outlier based on the score of the second model, the standard deviation and the mean.

5. The anomaly detection system of claim 1, wherein the security application is configured to calculate the first score as a distance based on a two sample Kolmogorov-Smirnov test.

6. The anomaly detection system of claim 1, the security application is configured to:
determine a plurality of models for a finite number of the plurality of users, wherein the plurality of models include the second model;
score the plurality of models to generate a plurality of scores, wherein the plurality of scores includes the first score;
detect a plurality of outliers including the first user based on the plurality of scores;
determine whether a number of the plurality of outliers satisfies a predetermined amount; and
adjust a threshold used to detect the plurality of outliers if the number of the plurality of outliers does not satisfy the predetermined amount.

7. The anomaly detection system of claim 1, wherein the security application is configured to:
determine a baseline based on the behavior data corresponding to the plurality of users;
determine a risk value based on anomaly data associated with the detected anomaly including determining a probability that the anomaly is to occur based on the baseline; and
perform the countermeasure based on the risk value.

8. The anomaly detection system of claim 1, wherein:
the security application collects the behavior data for the plurality of users by requesting logs from at least one of a proxy, a gateway and a firewall; and
the logs include fields indicating access periods of the cloud applications, Internet protocol addresses of client computers of the plurality of users, usernames of the plurality of users, names of the cloud applications, volumes of data transferred between the client computers and machines of the cloud applications, a number of failed login attempts by each of the plurality of users, and numbers of transactions between the client computers and the machines of the cloud applications.

9. An anomaly detection system comprising:
a processor;
a memory; and
a security application stored in the memory and including instructions, which are executable by the processor and are configured to:
collect behavior data corresponding to a plurality of client computers of an organization accessing cloud applications via a distributed network, wherein the behavior data includes one or more parameters tracked over time for the plurality of client computers, and wherein the cloud applications are implemented on one or more server computer(s) of a service provider;

create a first model for the organization based on the
behavior data tracked for the plurality of client
computers;
create a second model corresponding to a first client
computer of the plurality of client computers based
on the one or more parameter(s) tracked for the
plurality of client computers except the first client
computer, wherein the second model excludes
behavior data pertaining to the first client computer;
score the second model based on the first model to
generate a first score, wherein generating the first
score is performed by at least performing the following:
determining a first cumulative distribution function
based on the first model;
determining a second cumulative distribution function based on the second model; and
calculating the first score as a distance between the
first cumulative distribution function and the second cumulative distribution function;
determine whether the first client computer is an outlier
based on the first score;
remove the behavior data corresponding to the first
client computer from the first model if the first client
computer is determined to be an outlier;
recreate the first model based on the behavior data
tracked for the plurality of client computers except
for the first client computer;
detect an anomaly based on the recreated first model
and
perform a countermeasure in response to detection of
the anomaly.

10. The anomaly detection system of claim 9,
wherein the first model and the second model are histograms.

11. The anomaly detection system of claim 9, wherein the
security application is configured to:
determine a baseline based on the behavior data of the
plurality of client computers;
determine a plurality of models, where each of the plurality of models is for a respective one of the plurality
of client computers;
score each of the plurality of models based on the baseline
or the first model, wherein the plurality of models do
not include the second model;
determine a standard deviation and a mean based on the
scores of the plurality of models; and
determine whether the first client computer is an outlier
based on the score of the second model, the standard
deviation and the mean.

12. The anomaly detection system of claim 9, wherein the
security application is configured to calculate the first score
as a distance based on a two sample Kolmogorov-Smirnov
test.

13. The anomaly detection system of claim 9, wherein the
security application is configured to:
determine a plurality of models for a finite number of the
plurality of client computers, wherein the plurality of
models include the second model;
score the plurality of models to generate a plurality of
scores, wherein the plurality of scores includes the first
score;
detect a plurality of outliers including the first client
computer based on the plurality of scores;
determine whether a number of the plurality of outliers
satisfies a predetermined amount; and
adjust a threshold used to detect the plurality of outliers if
the number of the plurality of outliers does not satisfy
the predetermined amount.

14. The anomaly detection system of claim 9, wherein the
security application is configured to:
determine a baseline based on the behavior data corresponding to the plurality of client computers;
determine a risk value based on anomaly data associated
with the detected anomaly including determining a
probability that the anomaly is to occur based on the
baseline; and
perform the countermeasure based on the risk value.

15. One or more computer-readable hardware storage
device(s) having stored thereon computer-executable
instructions that are operable, when executed by one or more
processor(s) of a computer system, to cause the computer
system to detect an anomaly associated with access of a
cloud application by causing the computer system to:
collect behavior data corresponding to a plurality of users
of an organization accessing cloud applications via a
distributed network, wherein the behavior data includes
one or more parameter(s) tracked over time for the
plurality of users, and wherein the cloud applications
are implemented on one or more server computer(s) of
a service provider;
create a first model for the organization based on the
behavior data tracked for the plurality of users;
create a second model corresponding to a first user of the
plurality of users based on the one or more parameter(s)
tracked for the plurality of users except the first user,
wherein the second model excludes behavior data pertaining to the first user;
score the second model based on the first model to
generate a first score, wherein generating the first score
is performed by at least performing the following:
determining that the first model includes a first histogram;
determining that the second model includes a second
histogram; and
calculating the first score by comparing the first histogram against the second histogram;
determine whether the first user is an outlier based on the
first score;
remove the behavior data corresponding to the first user
from the first model if the first user is determined to be
an outlier;
recreate the first model based on the behavior data tracked
for the plurality of users except for the first user;
detect the anomaly based on the recreated first model; and
perform a countermeasure in response to detection of the
anomaly.

16. The one or more computer-readable hardware storage
device(s) of claim 15, wherein execution of the computer-executable instructions further causes the computer system
to:
determine a first cumulative distribution function based
on the first model;
determine a second cumulative distribution function
based on the second model; and
calculate the first score as a distance between the first
cumulative distribution function and the second cumulative distribution function.

17. The one or more computer-readable hardware storage
device(s) of claim 15, wherein execution of the computer-executable instructions further causes the computer system
to:

determine a baseline based on the behavior data of the plurality of users;

determine a plurality of models, where each of the plurality of models is for a respective one of the plurality of users;

score each of the plurality of models based on the baseline or the first model, wherein the plurality of models do not include the second model;

determine a standard deviation and a mean based on the scores of the plurality of models; and determine whether the first user is an outlier based on the score of the second model, the standard deviation and the mean.

18. The one or more computer-readable hardware storage device(s) of claim 15, wherein the first score is calculated as a distance based on a two sample Kolmogorov-Smirnov test.

19. The one or more computer-readable hardware storage device(s) of claim 15, wherein execution of the computer-executable instructions further causes the computer system to:

determine a plurality of models for a finite number of the plurality of users, wherein the plurality of models include the second model;

score the plurality of models to generate a plurality of scores, wherein the plurality of scores includes the first score;

detect a plurality of outliers including the first user based on the plurality of scores;

determine whether a number of the plurality of outliers satisfies a predetermined amount; and adjust a threshold used to detect the plurality of outliers if the number of the plurality of outliers does not satisfy the predetermined amount.

* * * * *